3,197,315
REFRACTORY COMPOSITION AND METHOD
FOR PRODUCING SAME
Louis J. Jacobs and Carl J. Cherry, Chicago, Ill., assignors to The S. Obermayer Co., Chicago, Ill., a corporation of Ohio
No Drawing. Filed Oct. 3, 1962, Ser. No. 228,003
4 Claims. (Cl. 106—65)

This invention relates to a refractory composition and to a method of producing and using the same and more particularly to the manufacture of a refractory composition which is non-sticky and free-flowing such that it may be readily utilized as a gunning composition yet which when wet with water upon gunning is rendered suitable for firing into a stable refractory article having excellent refractory characteristics.

The initial prerequisite for a gunning composition is that the aggregate composition should be non-sticky and free-flowing so that it may be packaged, stored, and handled without agglomerating prior to the actual gunning operation. However, when the material is gunned or rammed into place, it must be capable of agglomerating to a prefiring green state characterized by rigidity of shape. Finally, as the composition is dried and fired, it must be capable of yielding a refractory composition having chemical and physical properties suitable for its environment and use.

This invention achieves such a gunning composition principally by compounding into the formulation of the aggregate refractory composition a relatively fine refractory component which has been precoated with a fatty acid lubricant, thereby rendering the resultant composition free-flowing and non-sticky but wettable with water to form a composite refractory having unexcelled rerfactory properties. In a preferred operation, a first relatively coarse refractory composition is coated with an inorganic acid component so as to yield a sticky aggregate; then a relatively fine refractory component is added to reduce the stickiness of the composite; and finally a fatty acid coated relatively fine refractory component is added to yield the desired free-flowing gunning composition. In use, the composition so formed is mixed with water during a gunning or ramming operation and is readily wet thereby so as to form a cohesive mass which may be fired into the ultimate refractory structure.

Accordingly, it is a primary object of this invention to provide a superior refractory gunning composition by the utilization of a fatty acid coated refractory component as a lubricant.

It is a further object of this invention to provide a method for formulating a refractory gunning composition and for utilizing the composition to yield a high quality and economical monolithic refractory construction characterized by good green strength; low shrinkage properties; negligible rebound loss; excellent spall or thermal shock resistant qualities; hardness and abrasion resistance; volume stability; high transverse strength; and excellent slag and scale resistant characteristics.

These and other objects, features, and advantages of the subject invention will hereinafter appear and, for purposes of illustration, but not of limitation, and exemplary description of the subject invention follows.

The invention may be illustrated by the formulation and use of a typical high alumina content refractory composition suitable for the lining and repairing of furnace structures by gun or ram placement. The exemplary composition is formulated from the following basic materials:

| | Percent |
|---|---|
| 0.25 inch–10.0 mesh calcined alumina | 25–70 |
| 100–325 mesh calcined alumina | 10–35 |
| 30–40 mesh raw kyanite | 5–35 |
| Kaolin | 5–15 |
| 85% phosphoric acid | 1–8 |
| Boric acid | 0.1–0.5 |
| Fatty acid coated calcined alumina | 0.5–5.0 |

The ranges of the composition of the fatty acid coated calcined alumina are as follows:

| | Percent |
|---|---|
| 100–325 mesh calcined alumina | 85.0–99.50 |
| Fatty acid mixture | 0.50–15.0 |

Preferably the designated fatty acid comprises palmitic or stearic acids or mixtures of the two acids, although equivalent amounts of other fatty acids and metal salts thereof perform satisfactorily. For example, aluminum stearate and zinc stearate have been found to be suitable.

A gunning material corresponding to the general formulation is produced in three general steps: first, a relatively coarse sticky aggregate is formed by admixing the relatively coarse component, namely, the 0.25 inch to 10 mesh calcined alumina, the kyanite, and the kaolin, with the acid binder, namely, the phosphoric and boric acids; second, the relatively fine component, namely, the 100–325 mesh calcined alumina, is added to reduce the stickiness of the composite aggregate; and finally, the pre-coated relatively fine refractory component, namely, the fatty acid coated 100–325 mesh calcined alumina, is added to yield a non-sticky and free-flowing gunning composition.

The coated relatively fine refractory component is formed by mixing the alumina with the indicated amount of fatty acid, heating the mixture in excess of the melting point of the fatty acid, thereby to thoroughly coat and impregnate the alumina with the fatty acid, and cooling the mixture before adding it to the remaining components as specified.

The gunning composition produced by the aforementioned steps does not pack or ball up and is substantially non-sticky such that it will readily flow into a packing bag. In use, the contents of the bag are placed in the hopper of a conventional gunning unit, from which the material readily flows through a pressurized spray nozzle where the composition is mixed with water and projected against a wall or other surface or a refractory structure.

The addition of water at the nozzle produces a sticky material which knits together to form a dense non-porous monolithic refractory construction of high quality and economy. The high alumina gunning material so installed has low shrinkage, good green strength, and upon drying and firing, excellent high strength characteristics. The rebound loss of the refractory construction is negligible due to the sticky characteristics of the wetted refractory.

The high alumina gunning refractory composition can be gunned into any desired shape to form a furnace lining or part of a furnace lining. The gunned lining produced in accordance with the foregoing formulation is white, smooth, and free of brick joints which are ordinarily a point of disintegration of brick furnace linings due to slag attack and thermal spalling. After firing, the gunned refractory becomes very hard and very strong and has excellent spall or thermal shock resistance, hardness and abrasion resistance, transverse strength, volume stability, and scale and slag attack resistance.

As a more specific description of the subject invention, the following example is given:

*Example 1*

| | Percent |
|---|---|
| 6 mesh calcined alumina | 53.20 |
| 325 mesh calcined alumina | 23.80 |
| 35 mesh raw kyanite | 8.88 |
| Kaolin | 8.12 |
| 85% phosphoric acid | 3.18 |
| Boric acid | 0.15 |
| Coated 325 mesh calcined alumina | 2.67 |
| | 100.00 |

The above-mentioned material is produced by formulating the ingredients in a suitable mixer in the following manner: The 6 mesh calcined alumina, 35 mesh raw kyanite, phosphoric acid, boric acid, and kaolin ingredients are mixed for two minutes, and then the 325 mesh calcined alumina is added with mixing for an additional two minutes. The precoated 325 mesh calcined alumina is then added with mixing for an additional minute, whereupon the composite produced is discharged from the mixer and is packed into suitable paper containers for shipment to the site of use.

The precoated 325 mesh calcined alumina is produced by mixing in a ribbon type externally heated mixer the following ingredients:

The precoated 325 mesh calcined alumina is produced by mixing in a ribbon type externally heated mixer the following ingredients:

| | Percent |
|---|---|
| 325 mesh calcined alumina | 98.36 |
| Fatty acid mixture | 1.64 |

This mixture is heated slightly above 300° F. (the melting point of the fatty acid mixture) and is cooled before adding to the mixer containing the previously mentioned ingredients. Advantageously, said fatty acid mixture comprises 93% palmitic acid, 6% stearic acid, and 1% oleic acid.

When the ingredients of this example are mixed without the coated 325 mesh calcined alumina, the material produced is sticky and tends to pack or ball up, rendering it unsuitable for gunning use. However, with the addition of the coated 325 mesh calcined alumina the resultant mixture exhibits non-stick free-flowing properties whereby the gunning material will readily flow into and through conventional gunning equipment presently available to furnace builders.

The described gunning refractory is then dried at 230° F. to yield the resultant refractory construction. This material, when subjected to American Society for Testing Materials super-duty plastic refractory panel spalling test C-180-52, showed a negligible spall loss. This test is conducted by heating the panel under test for 24 hours at 3000° F., then cooling and reheating to 2550° F. for ten minutes, and finally cooling in ten minutes with an air-water mist blast. The test consists of twelve cycles of heating and cooling as described. Although most high alumina refractory constructions spall very readily when subjected to such a test, as noted, the exemplary composition exhibited a negligible spall loss under the test conditions.

It should be understood that the fatty acid coated fine material need not necessarily be alumina as described; alternative materials could be silica, calcined clay, lime, magnesia, olivine, or chrome. The coated alumina has been described since it is compatible with the refractory alumina materials which have been chosen to illustrate the nature of the invention.

It should be further understood that the invention is not limited to the specific embodiments disclosed, and that various deviations may be made therefrom without departing from the spirit and the scope of the appended claims.

What is claimed is:

1. A non-sticky free-flowing refractory gunning composition consisting essentially of:

| | Percent |
|---|---|
| 0.25 inch–10.0 mesh alumina | 25–70 |
| 100–325 mesh alumina | 10–35 |
| 30–40 mesh kyanite | 5–35 |
| Kaolin | 5–15 |
| 85% phosphoric acid | 1–8 |
| Boric acid | 0.1–0.5 |
| Coated alumina | 0.50–5.0 | wherein the coated alumina comprises:

| | |
|---|---|
| 100–325 mesh alumina | 85.0–99.5 |
| Coating material | 0.50–15.0 | the said coating material being selected from the group consisting of fatty acids, aluminum and zinc salts of fatty acids, and mixtures thereof.

2. A process for producing a non-sticky free-flowing alumina gunning composition comprising the steps of:
(A) mixing from about 25 to about 70 parts by weight of 0.25 inch to 10 mesh calcined alumina, from about 5 to 35 parts by weight of 30–40 mesh kyanite, and from about 5 to 15 parts by weight of kaolin to provide a homogeneous blend;
(B) adding to said blend an inorganic binder consisting essentially of from about 1 to about 8 parts by weight of 85% phosphoric acid and from about 0.1 to about 0.5 part by weight of boric acid to form a sticky aggregate;
(C) adding from about 10 to about 35 parts by weight of 100–325 mesh alumina to said aggregate to reduce the stickiness thereof;
(D) preparing from about 0.5 to about 5 parts by weight of coated alumina consisting essentially of about 85.0 to about 99.5 percent by weight of 100–325 mesh alumina and about 0.5 to about 15 percent by weight of a coating material selected from the group consisting of fatty acids, aluminum and zinc salts of fatty acids, and mixtures thereof to provide a solid phase lubricating and particulating agent; and
(E) distributing said lubricating and particulating agent substantially uniformly throughout said aggregate to provide a free-flowing refractory gunning composition.

3. A non-sticky free-flowing refractory gunning composition consisting essentially of:

| | Percent |
|---|---|
| 6 mesh calcined alumina | 53.2 |
| 325 mesh calcined alumina | 23.8 |
| 35 mesh raw kyanite | 8.88 |
| Kaolin | 8.12 |
| 85% phosphoric acid | 3.18 |
| Boric acid | 0.15 |
| Coated alumina | 2.67 | wherein the coated alumina comprises:

| | |
|---|---|
| 325 mesh calcined alumina | 98.36 |
| Coating material | 1.64 | said coating material being selected from the group consisting of fatty acids, aluminum and zinc salts of fatty acids, and mixtures thereof.

4. A process for producing a non-sticky free-flowing refractory gunning composition comprising the steps of:
(A) mixing 53.2 parts by weight of 6 mesh calcined alumina, about 8.9 parts by weight of 35 mesh raw kyanite, and about 8.1 parts by weight of kaolin to provide a homogeneous blend;

(B) adding to said blend an inorganic binder consisting essentially of about 3.2 parts by weight of 85% phosphoric acid and about 0.15 part by weight of boric acid to form a sticky aggregate;
(C) adding about 23.8 parts by weight of 325 mesh alumina to said aggregate to reduce the stickiness thereof;
(D) preparing about 2.7 parts by weight of coated alumina consisting essentially of about 98.4 percent by weight of 325 mesh alumina and about 1.6 percent by weight of a coating material selected from the group consisting of fatty acids, aluminum and zinc salts of fatty acids, and mixtures thereof to provide a solid phase lubricating and particulating agent; and
(E) distributing said lubricating and particulating agent substantially uniformly throughout said aggregate to provide a free-flowing refractory gunning composition.

References Cited by the Examiner
UNITED STATES PATENTS

| | | | |
|---|---|---|---|
| 2,870,032 | 1/59 | Jacobs | 106—67 |
| 3,080,243 | 3/63 | Vodicka | 106—67 |

TOBIAS E. LEVOW, *Primary Examiner.*